(12) United States Patent
Chang

(10) Patent No.: US 9,990,053 B2
(45) Date of Patent: Jun. 5, 2018

(54) KEYBOARD WITH DETACHABLE KEYS AND METHOD OF CONTROLLING THE SAME

(71) Applicant: Yao-Jen Chang, Taipei (TW)

(72) Inventor: Yao-Jen Chang, Taipei (TW)

( * ) Notice: Subject to any disclaimer, the term of this patent is extended or adjusted under 35 U.S.C. 154(b) by 132 days.

(21) Appl. No.: 14/922,805

(22) Filed: Oct. 26, 2015

(65) Prior Publication Data

US 2016/0266658 A1 Sep. 15, 2016

(30) Foreign Application Priority Data

Mar. 12, 2015 (TW) .............................. 104107930 A

(51) Int. Cl.
*G06F 3/02* (2006.01)
*G06F 3/023* (2006.01)

(52) U.S. Cl.
CPC .......... *G06F 3/0238* (2013.01); *G06F 3/0202* (2013.01)

(58) Field of Classification Search
CPC ......... G06F 3/02; G06F 3/0238; G06F 3/0202
USPC ......................................................... 345/168
See application file for complete search history.

(56) References Cited

U.S. PATENT DOCUMENTS

| 8,866,642 | B2* | 10/2014 | Ron | H03M 11/24 345/168 |
| 2002/0154038 | A1* | 10/2002 | Houston | G06F 3/0238 345/168 |
| 2004/0056781 | A1* | 3/2004 | Rix | G06F 3/0202 341/20 |
| 2005/0001820 | A1* | 1/2005 | Lee | G06F 3/0216 345/168 |
| 2005/0057517 | A1* | 3/2005 | Rix | G06F 3/0202 345/168 |
| 2006/0007160 | A1* | 1/2006 | Lutnick | G06F 3/0219 345/168 |
| 2007/0065215 | A1* | 3/2007 | Brown | G06F 3/0238 400/490 |
| 2007/0285393 | A1* | 12/2007 | Ishakov | G06F 3/0238 345/168 |
| 2007/0286662 | A1* | 12/2007 | King | G06F 3/0219 400/489 |
| 2010/0238054 | A1* | 9/2010 | Chang | H03M 11/22 341/22 |
| 2011/0303517 | A1* | 12/2011 | Liu | H01H 13/705 200/5 A |

* cited by examiner

*Primary Examiner* — Adam J Snyder
(74) *Attorney, Agent, or Firm* — Tracy Heims; Apex Juris, PLLC.

(57) ABSTRACT

A keyboard and a method of controlling the same are provided. The keyboard includes a base, a plurality of keys, a plurality of key chips and a controller. The base has a plurality of connecting portions. Each key is detachably connected to one of the connecting portions. Each key chip is correspondingly disposed on one of the keys and has a corresponding key code. The controller is disposed on the base. The controller outputs an inquiring code to each key chip, and each key chip determines whether the key code thereof corresponds to the inquiring code. The key chip which has the corresponded key code feedbacks a press state of the corresponding key to the controller.

17 Claims, 9 Drawing Sheets

KEYBOARD WITH DETACHABLE KEYS AND METHOD OF CONTROLLING THE SAME

BACKGROUND OF THE INVENTION

1. Technical Field

The present invention relates generally to a keyboard and a method of controlling the keyboard, and more particularly to a keyboard which has detachable keys and a control method thereof.

2. Description of Related Art

A conventional keyboard has a base and a plurality of keycaps which are connected onto the base, wherein each keycap is connected to a corresponding connecting portion of the base. However, each connecting portion of the base represents a designated key code, and therefore the location-representation relation of each keycap is fixed even if any keycap is moved to another connecting portion. In other words, the use of the conventional keyboard is limited.

BRIEF SUMMARY OF THE INVENTION

In view of the above, the primary objective of the present invention is to provide a keyboard and a method of controlling the keyboard, wherein each key of the keyboard has a designated key code thereon, and is detachably connected to the base. Whereby, the application of the keyboard could be extensive.

The present invention provides a keyboard, including a base, a plurality of keys, plurality of key chips, and a controller. The base has a plurality of connecting portions. Each of the plurality of keys is correspondingly and detachably connected to one of the plurality of connecting portions. Each of the plurality of key chips is correspondingly disposed on one of the plurality of keys, and has a corresponding key code. The controller is disposed on the base. The controller outputs an inquiring code to each of the plurality of key chips, and each of the key chips determines whether the key code thereof corresponds to the inquiring code. The key chip which has the corresponded key code feedbacks a press state of the corresponding key to the controller.

The present invention further provides a method of controlling a keyboard, including the following steps. First, provide a keyboard which includes a base, a plurality of keys, a plurality of key chips, and a controller. The base has a plurality of connecting portions. Each of the plurality of keys is correspondingly connected to one of the plurality of connecting portions in a detachable way. Each of the plurality of key chips is correspondingly disposed on one of the plurality of keys, and has a corresponding key code. The controller is disposed on the base. Second, output an inquiring code through the controller to each of the plurality of key chips. Afterward, determine whether the key code of each of the key chips corresponds to the inquiring code. Finally, feedbacks the controller with a press state of the corresponding key disposed with the key chip having the corresponded key code.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
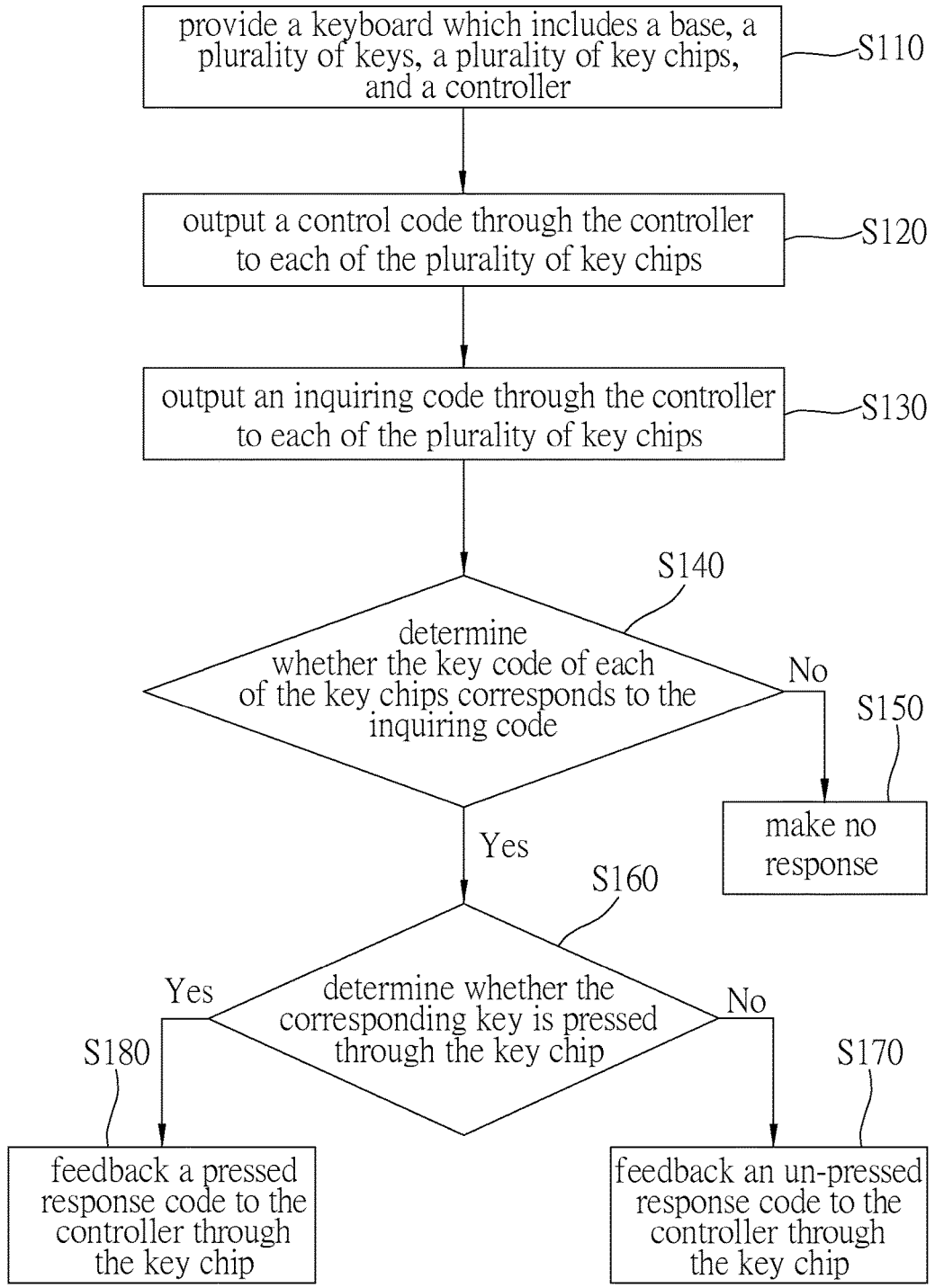
FIG. 1 is a flow chart of a first preferred embodiment of the present invention, showing the method of controlling the keyboard.
Figure 2:
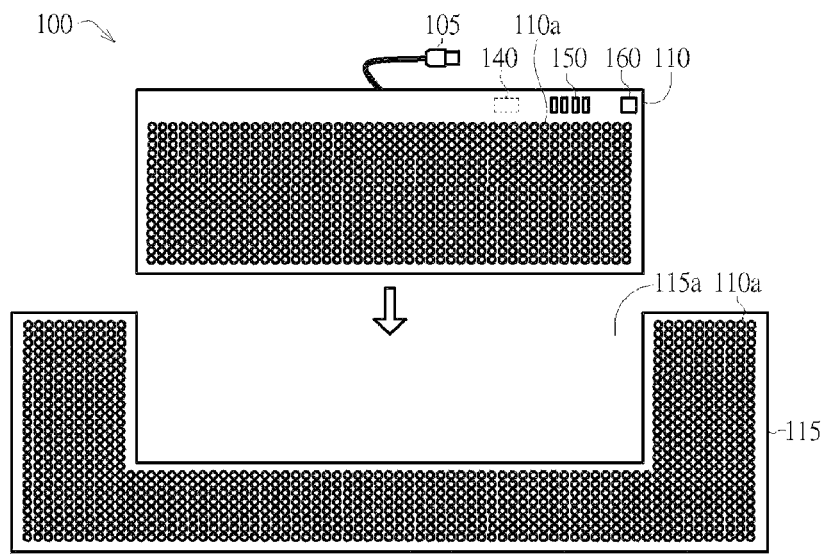
FIG. 2A is a exploded view of the keyboard of the first preferred embodiment.
FIG. 2B is a top view of the keyboard of the first preferred embodiment.
Figure 2:
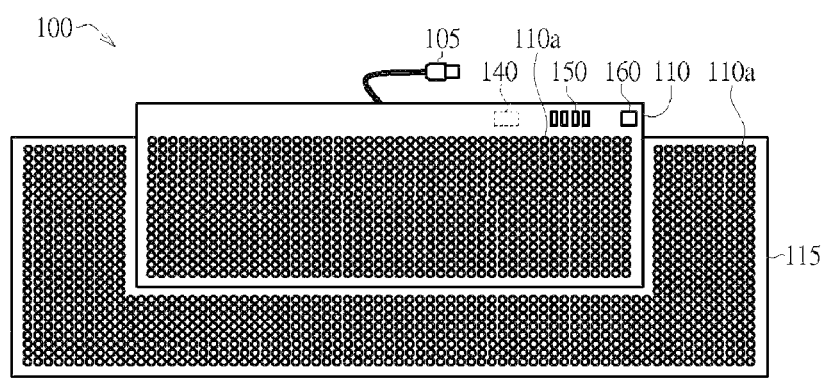
Figure 3:
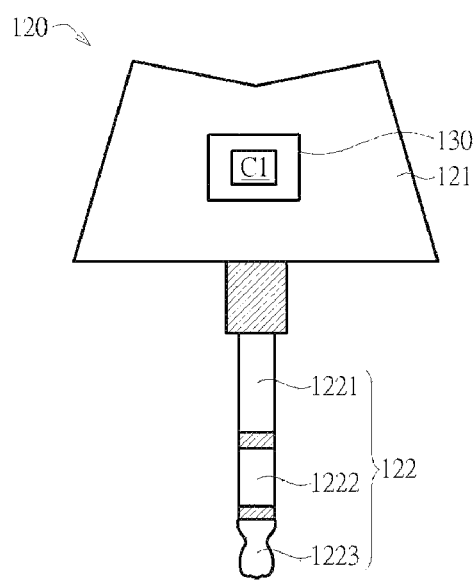
FIG. 3 is a schematic diagram of the key applied with the first preferred embodiment.

As shown in FIG. 1, a method of controlling a keyboard is illustrated. At first, provide a keyboard 100 which includes an adapter 105, a base 110, an expanded base 115, a plurality of keys 120, a plurality of key chips 130, and a controller 140, as shown in FIG. 2A to FIG. 3. The keyboard 100 is electrically connected to a host (not shown) through the adapter 105 for controlling or being controlled by the host, wherein the host could be a server, game console, or other device which receives inputting data during working. In the first preferred embodiment, the adapter 105 is a Universal Serial Bus (USB).

The base 110 has a plurality of connecting portions 110a. The keys 120 are detachably connected to the connecting portions 110a, wherein each of the keys 120 is correspondingly connected to one of the connecting portions 110a. In this embodiment, the keyboard 100 is a standard keyboard which has a standard number of the connecting portions 110a to be connected to a standard number of the keys 120; however, the number of the connecting portions 110a is not limited to that, but also may be two or more than two in other embodiments. Additionally, the controller 140 is provided on the base 110 to send signals to or receive signals from the keys 120.

The expanded base 115 is an optional equipment electrically connected to the base 110, and has a recess to contain the base 110, and at least one connecting portions 110a to be connected to the keys 120. When the base 110 is connected to the expanded base 115, the controller 140 outputs signals to or/and receives signals from the keys 120 connected to the expanded base 115 through the base 110.

As shown in FIG. 3, each of the keys 120 includes a key cap 121 and a connector 122, wherein the connector 122 is connected to the key cap 121. In the preferred embodiment, the connector 122 is a male connector, and each of the connecting portions 110a is a jack. However, in an alternative embodiment, the connector 122 could be a jack, and the connecting portion 110a could be a male connector. Each of the connector 122 is detachably connected to one of the connecting portions 110a correspondingly. Moreover, each of the connectors 122 has three electrical contacts, which are a first electrical contact 1221, a second electrical contact 1222, and a third electrical contact 1223, wherein the electrical functions of the electrical contacts 1221, 1222, and 1223 are different from each other. In this embodiment, the electrical contacts 1221, 1222, and 1223 are a ground terminal, a signal terminal, and a power supply terminal respectively. In additional, each of the connecting portions 110a on the base 110 may have a plurality of electrical contacts (not shown) to be electrically connected to the electrical contacts 1221, 1222, and 1223 of the connector 122.

Furthermore, each of the key chips 130 is correspondingly disposed on one of the keys 120, and has a corresponding key code C1, wherein the key code C1 of each of the key chips 130 are different from each other. In the first preferred embodiment, the key code C1 is recorded on the key chip 130, and therefore the location of the key code C1 is changeable along with the location changing of the keys 120. In another embodiment, the key code C1 could be saved in a memory (e.g. a non-volatile memory) of each of the key chips 130.

Figure 4:
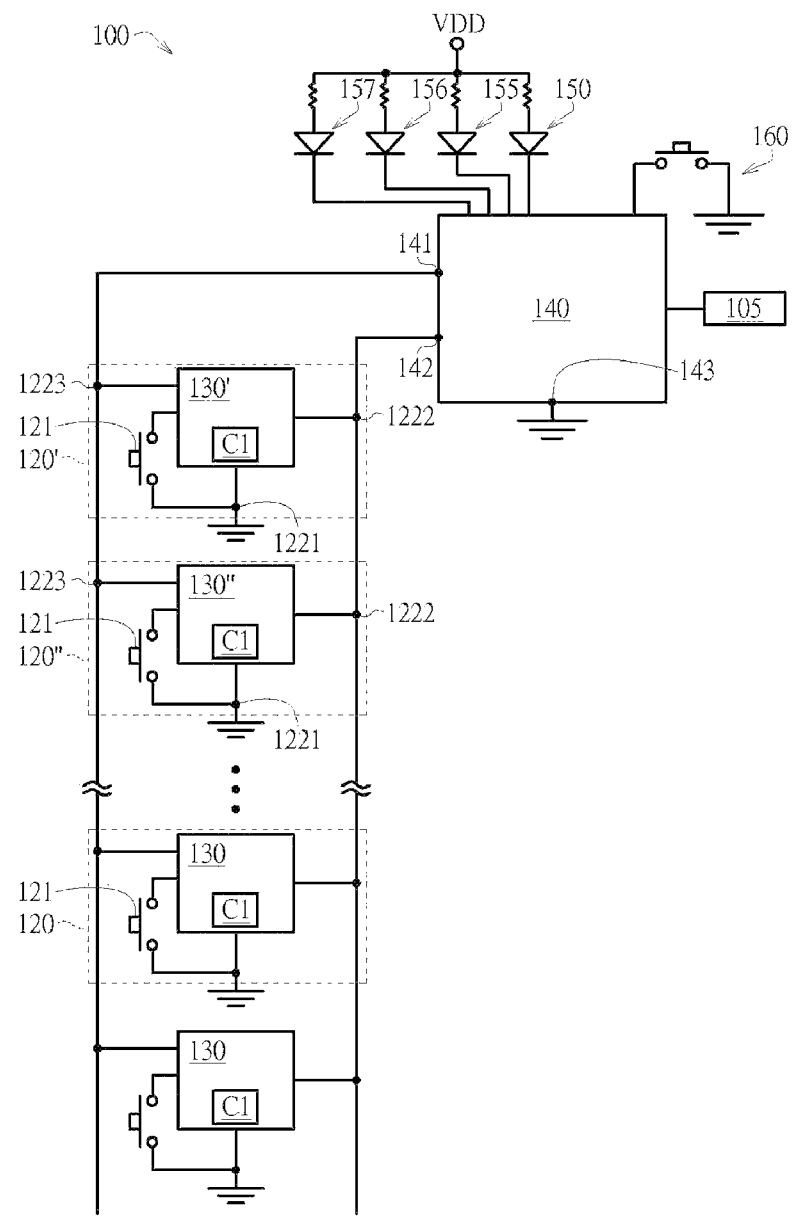
FIG. 4 is a circuit diagram of the keyboard of the first preferred embodiment.

As shown in FIG. 4, the key chips 130, 130', and 130" are connected in parallel, wherein the first electrical contacts 1221 of the key chips are connected in parallel through a single conducting wire (not shown), the second electrical contacts 1222 of the key chips are connected in parallel through another single conducting wire, and also, the third electrical contacts 1223 of the key chips are connected in parallel through another single conducting wire. Accordingly, the controller 140 reads states of each key through different circuit, which solves the problem of ghost keys in conventional matrix scanning circuits.

Moreover, the controller 140 has a power supply terminal 141, a signal terminal 142, and a ground terminal 143, wherein the power supply terminal 141 is electrically connected to the third electrical contacts 1223 of the keys 120 to supply power to each of the key chips 130, 130', and 130". The signal terminal 142 is electrically connected to the second electrical contacts 1222 of the keys 120 to output signals to each of the key chips 130, 130', and 130". The ground terminal 143 is electrically connected to the first electrical contacts 1221. In an alternative embodiment, the first electrical contact 1221 and the third electrical contact 1223 of each of the chips 130, 130', and 130" are exchangeable; after exchanging, the first electrical contact 1221 is changed to a power supply terminal, and the third electrical contact 1223 is changed to a ground terminal.

Additionally, the keyboard 100 further includes a plurality of light-emitting elements, a first light-emitting element 155, a second light-emitting element 156, and a third light-emitting element 157, which are controlled by the controller 140. In the first preferred embodiment, the first light-emitting element 155 represents Stroll Lock of the keyboard 100, the second light-emitting element 156 represents Cap Lock of the keyboard 100, and the third light-emitting element 157 represents Num Lock of the keyboard 100.

Figure 5:
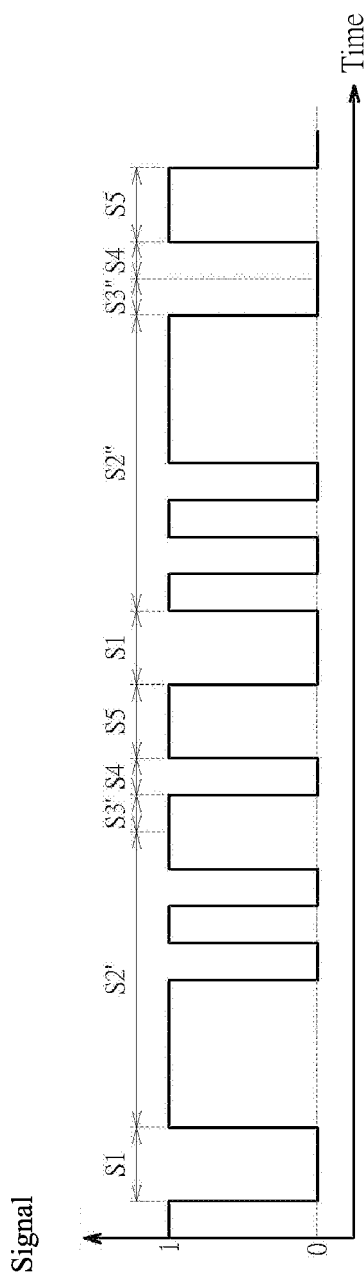
FIG. 5 is a timing chart of the I/O signals of the controller of the first preferred embodiment.

In step S120, the controller 140 outputs a control code S1 to each of the key chips 130 to request each of the key chips to determine whether the key code thereof corresponds to an upcoming inquiring code, and to feedback a press state of the key disposed with said key chip having the corresponded key code. As shown in FIG. 5, the length of the control code S1 is 2 bits; however, the length is not limited to 2 bits in other embodiments. In this preferred embodiment, the control code S1 is 00 (represented as binary), which reflects the abovementioned requesting of the controller 140. Also, the control code S1 is not limited to 00 in other embodiments.

In step S130, the controller 140 outputs the inquiring code S2' to each of the key chips 130, wherein the inquiring code S2' is corresponded to the key code C1 of at least one of the keys 120. Each of the key chips 130 determines whether the key code C1 thereof corresponds to the inquiring code S2', and the key chip 130 which has the corresponded key code C1 feedbacks the press state of the corresponding key 120 to the controller 140. For example, if the inquiring code S2' is corresponded to the key code C1 of the key chip 130' in FIG. 4, only the key chip 130' feedbacks the press state to the controller 140. In addition, the length of the inquiring code S2' is relative to the number of the keys 120, which would be inquired by the controller 140. For example, when the length of the inquiring code S2' is 8 bits, the controller 140 could inquire the press states of 256 (i.e. $2^8$) keys 120. In an alternative embodiment, the length of the inquiring code S2' is not limited to 8 bits.

In step S140, each of the key chips 130 determines whether the key code C1 thereof corresponds to the inquiring code S2'; if not, take the step S150 of making no response to the controller 140. In contrast, if the key code C1 of the key chips 130 corresponds to the inquiring code S2', take the step S160. For example, because the inquiring code S2' is corresponded to the key code C1 of the key chip 130' in FIG. 4, only the key chip 130' feedbacks the press state to the controller 140, while the other key chips making no response to the controller 140.

In step S160, the key chip 130' determines whether a corresponding key 120' is pressed; if not, take the step S170. In contrast, if the key 120' is pressed, take the step S180.

In step S180, the key chip 130' feedbacks a pressed response code S3' (as shown in FIG. 5) to the controller 140. In this preferred embodiment, the pressed response code S3' is 1, which represents the key 120' is pressed. In another embodiment, the pressed response code S3' could be 0.

Afterwards, the controller 140 can output an ending code S4, which represents an end of the inquiring process to the key 120', wherein the length of the ending code S4 is 1 bit, for example, 1 or 0. In another embodiment, the length of the ending code S4 could be longer than 1 bit.

Next, the controller 140 can continuously output the control code S1 and another inquiring code S2" to another key 120". In additional, the controller 140 can output an interval code S5 between two control codes S1 or between two inquiring codes S2 to make an interval. In this preferred embodiment, the interval code S5 represents a predetermined period of time (e.g. 1 to 3 milliseconds) for reset.

An inquiring process of the controller 140 to the key 120" is equivalent to the steps of S120 to S180 mentioned above.

In more details, as shown in FIG. 5, in step S120, the controller 140 outputs the control code S1 to each of the key chips 130. In step S130, the controller 140 outputs the inquiring code S2" to each of the key chips 130. In this embodiment, the inquiring code S2" is corresponded to the key code C1 of the key chip 130" in FIG. 4.

In step S140, each of the key chips 130 determines whether the key code C1 thereof corresponds to the inquiring code S2"; if not, take the step S150 of making no response to the controller 140. On the other hand, if the key code C1 of the key chips 130 corresponds to the inquiring code S2", take the step S160. For example, because the inquiring code S2" is corresponded to the key code C1 of the key chip 130", only the key chip 130" feedbacks the press state to the controller 140.

In step S160, the key chip 130" determines whether a corresponding key 120" is pressed; if not, take the step S170. However, if the key 120" is pressed, take the step S180.

In step S170, the key chip 130" feedbacks an un-pressed response code S3" to the controller 140. In this preferred embodiment, the un-pressed response code S3" is 0, which represents the key 120" is not pressed. In another embodiment, the un-pressed response code S3" could be 1.

Subsequently, the controller 140 can keep inquiring the press state of other keys, wherein the inquiring processes to the keys 120" are equivalent to the steps of S120 to S180, and therefore is not described in detail again. After inquiring the press states of all the keys 120, the controller 140 can re-inquire the press states of the keys 120 to monitor the press states continuously.

In conclusion, the controller 140 can inquire each of the key chips 130 through the particular inquiring code to get the press state of all the keys 120. In the first preferred embodiment, FIG. 5 illustrates a protocol to a get the press state of a standard keyboard. Accordingly, the keyboard 100 can be served as a booting keyboard without installing a driver, such as a USB Keyboard HID.

Figure 6:
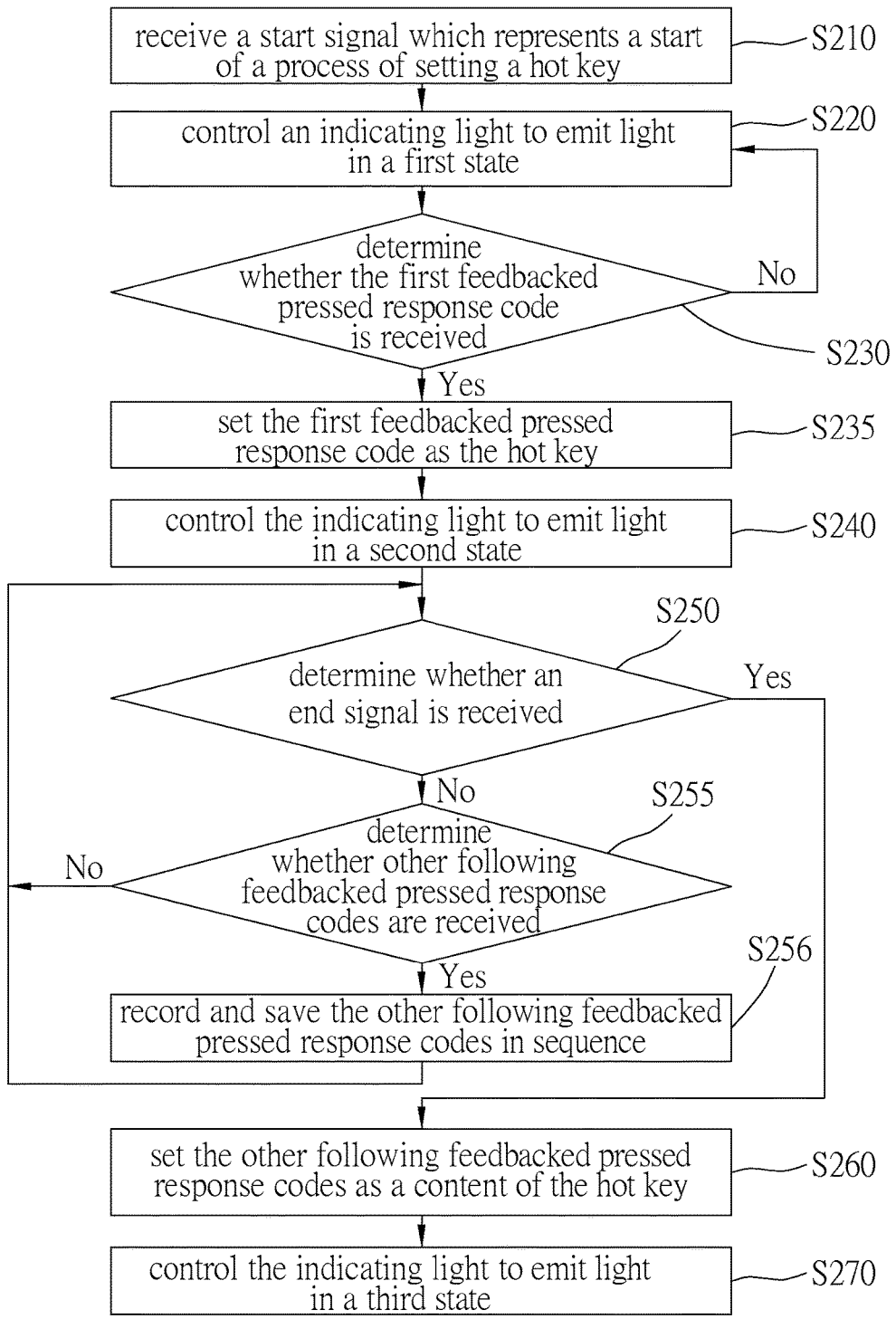
FIG. 6 is a flow chart of a second preferred embodiment of the present invention, showing the method of controlling the keyboard in FIG. 2A.

As shown in FIG. 6, a second preferred embodiment, which is a method of setting a hot key (e.g. Macro Key), is provided.

In the second preferred embodiment, the keyboard 100 further includes an indicating light 150 and a setting key 160, as shown in FIG. 2A. A user can start to set a hot key through pressing the setting key 160, which sends a start signal (not shown) to the controller 140 to represent a start of a process of setting a hot key. The state of setting a hot key can be indicated by the indicating light 150. In step S210, the controller 140 receives the start signal.

In step S220, the controller 140 controls the indicating light 150 to emit light in a first state.

In step S230, the controller 140 determines whether the first feedbacked pressed response code S3' is received; if not, back to step S220. In contrast, when the first feedbacked pressed response code S3' is received, take step S235 of setting the first feedbacked pressed response code S3' as the hot key.

In step S240, the controller 140 controls the indicating light 150 to emit light in a second state, wherein the second state is different from the first state. For example, the light color or the emitting pattern of the second state is different from that of the first state. In this preferred embodiment, the first state is emitting constantly, while the second state is a glittered light.

In step S250, the controller 140 determines whether an end signal is received, wherein if the user presses the setting key 160 again, the setting key 160 sends the end signal to the controller 140; the end signal represents an end of the process of setting the hot key. If the controller 140 receives no end signal, takes step S255 of determining whether other following feedbacked pressed response codes S3' are received. Next, when receiving the other following feedbacked pressed response codes S3', the controller 140 records and saves the other following feedbacked pressed response codes S3' in sequence (S256). However, if the controller 140 receives no other following feedbacked pressed response codes S3', then backs to step S250. In step S250, if the controller 140 receives the end signal, the takes step S260.

In step S260, the controller 140 sets the other following feedbacked pressed response codes S3' as a content of the hot key. After finishing the setting, pressing the hot key is equivalent to press the keys corresponded to the content of the hot key. In addition, if the controller 140 receives the end signal without going through steps S255 and S256, in step S260, the controller 140 would remove the content of the hot key, and back to an original state which have not started the process of setting the hot key yet, and consequently takes step S270. In another embodiment, if the controller 140 receives the end signal without going through steps S255 and S256, the controller 140 would takes step S270 right after step S260.

In step S270, the controller 140 controls the indicating light 150 to emit light in a third state, which represents the end of the process of setting a hot key. Additionally, the third state is different from the first and the second state. For example, the third state is no light.

Figure 7:
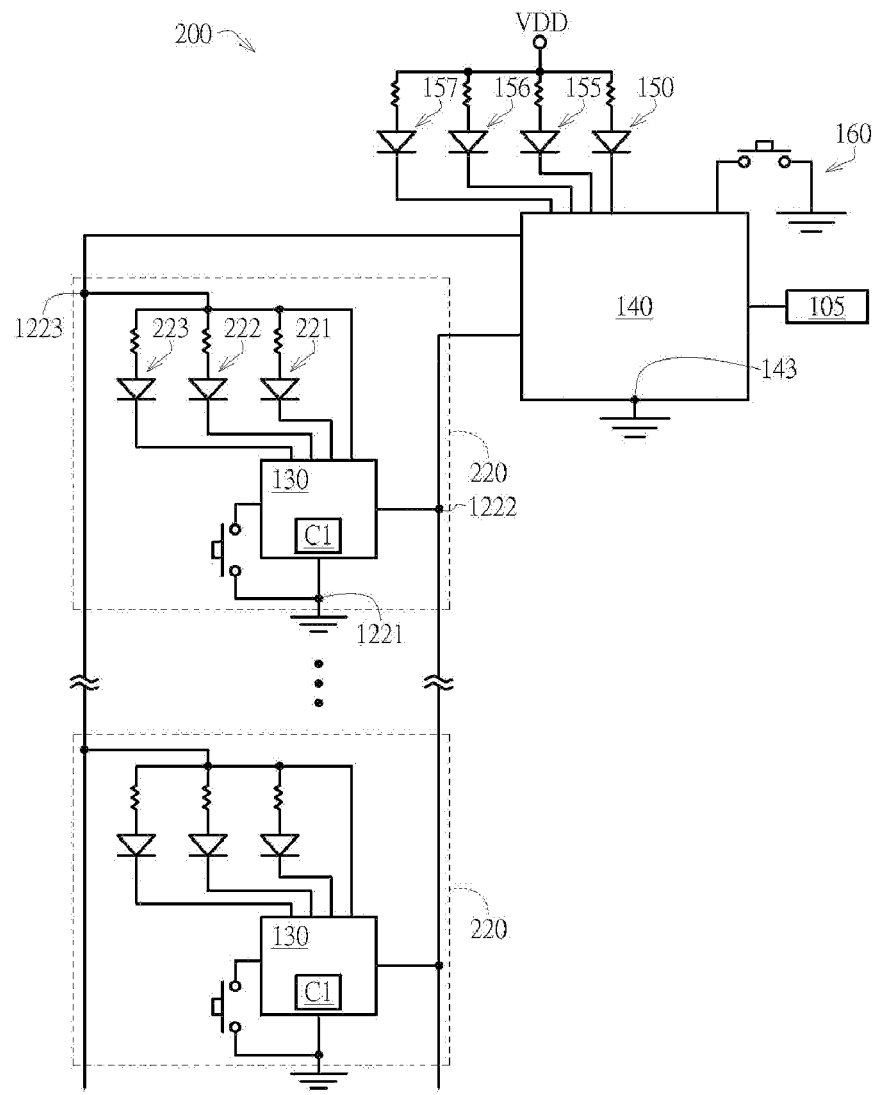
FIG. 7 is a circuit diagram of the keyboard of the third preferred embodiment.

As shown in FIG. 7, a keyboard 200 of the third preferred embodiment includes the adapter 105, a plurality of keys 220, the plurality of key chips 130, and the controller 140. In comparison with the keys 120 in the first preferred embodiment, the keys 220 further includes at least one light emitter, such as a first LED 221, a second LED 222, and a third LED 223, wherein the first LED 221, the second LED 222, and the third LED 223 are controlled by the key chip 130, and emit lights with colors different from each other. For example, if the control code S1 is 11, the key chip 130 controls at least one corresponding LED 211, 222, and 223 of the key 220 to emit light.

Figure 8:
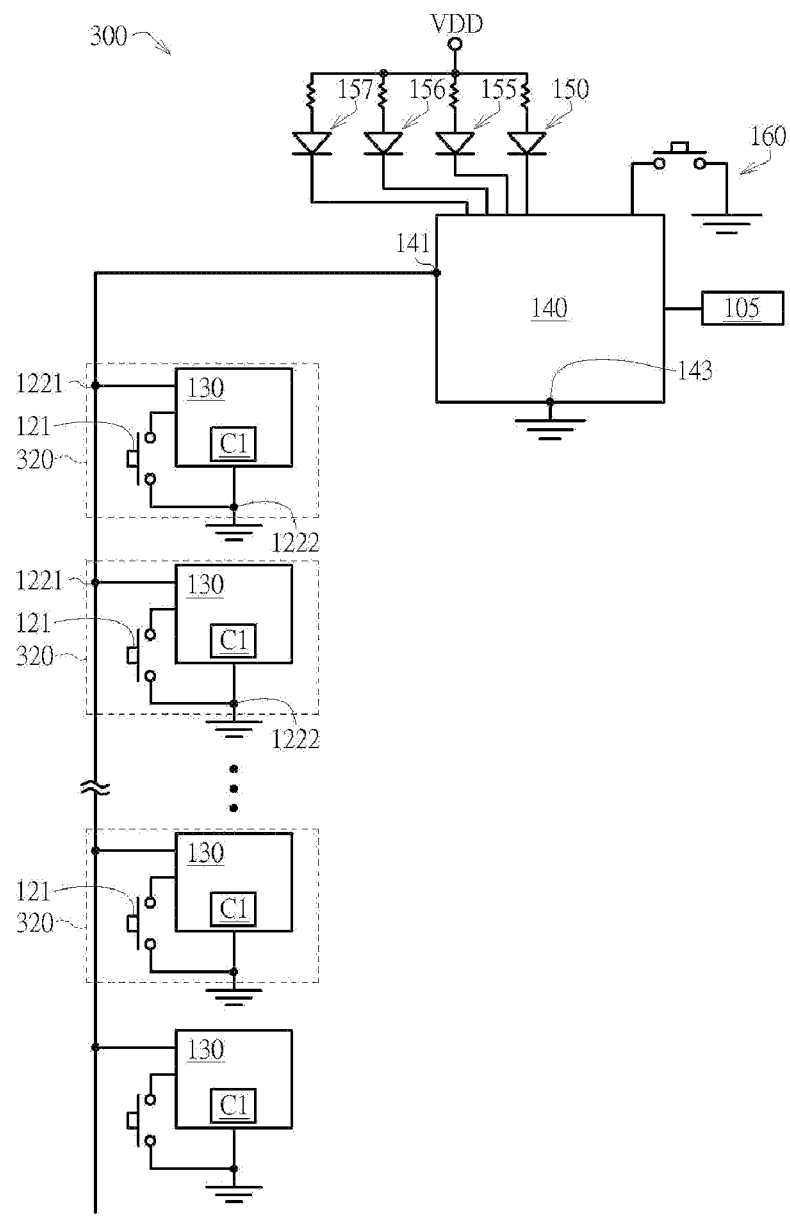
FIG. 8 is a circuit diagram of the keyboard of a fourth preferred embodiment.
Figure 9:
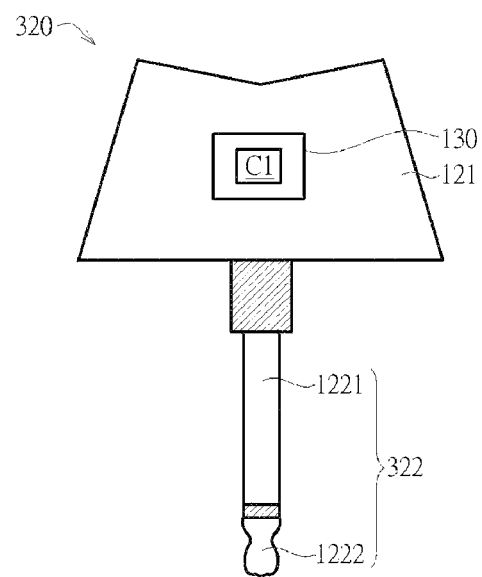
FIG. 9 is a schematic diagram of the key of the fourth preferred embodiment.

As shown in FIG. 8, a keyboard 300 of the fourth preferred embodiment includes the adapter 105, a plurality of keys 320, the plurality of key chips 130, and the controller 140. In comparison with the keys 120 in the first preferred embodiment, a connector 322 of each of the plurality of keys 320 illustrated in FIG. 9 only has two electrical contacts, which are a first electrical contact 1221 and a second electrical contact 1222. The first electrical contact 1221 is not only a power supply terminal but also a signal terminal, while the second electrical contact 1222 is a ground terminal. In an alternative embodiment, the first electrical contact 1221 is a ground terminal, and the second electrical contact 1222 is not only a power supply terminal but also a signal terminal. Furthermore, the electrical functions of the first electrical contact 1221 and the second electrical contact 1222 are exchangeable.

Moreover, in another preferred embodiment, the control code S1 controls the emitting state of the key 220. Additionally, the control code S1 could reflect a signal of reading or editing the key chip 130. For example, the control code S1 01 reflects the signal of editing the key chip 130, while the control code S1 10 reflects the signal of reading the key chip 130.

It must be pointed out that the embodiments described above are only some preferred embodiments of the present invention. All equivalent structures and methods which employ the concepts disclosed in this specification and the appended claims should fall within the scope of the present invention.

What is claimed is:

1. A keyboard, comprising:
   a base having a plurality of connecting portions, wherein the connecting portions are connected in parallel;
   a plurality of keys, wherein each of the keys comprises a key cap, a connector connected to the key cap, and a key chip correspondingly and electrically disposed on the key cap; the connector of each of the keys is detachably and electrically connected to one of the connecting portions; the key chip is electrically connected to the corresponding connector to be electrically connected in parallel; each of the plurality of key chips has a corresponding key code; and
   a controller which is disposed on the base and is electrically connected to the plurality of connecting portions;

wherein the controller communicates with all of the plurality of key chips by a protocol via the connecting portions connected in parallel, and outputs an inquiring code to all of the plurality of key chips at the same time; the inquiring code corresponds to key code of one of the key chips; each of the key chips receives the inquiring code and determines whether the key code thereof corresponds to the inquiring code; the key chip which has the corresponding key code feedbacks a press state of the corresponding key to the controller, wherein the press state is either a pressed response code or an un-pressed response code; the key chips not having the corresponded key codes make no response to the controller; the key chip which has the corresponded key code to the inquiring code determines whether the corresponding key is pressed; when the corresponding key is pressed, the key chip sends the pressed response code to the controller; when the corresponding key is not pressed, the key chip sends the un-pressed response code to the controller.

2. The keyboard of claim 1, wherein the controller outputs a control code to each of the plurality of key chips before outputting the inquiring code; the control code requests each of the key chips to determine whether the key code thereof corresponds to the upcoming inquiring code, and to feedback the press state of the key disposed with the key chip having the corresponded key code.

3. The keyboard of claim 1, wherein each of the plurality of connectors has three electrical contacts, which are a signal terminal, a ground terminal, and a power supply terminal.

4. The keyboard of claim 1, wherein each of the plurality of connectors has an electrical contact, which is not only a power supply terminal but also a signal terminal.

5. The keyboard of claim 1, wherein each of the plurality of connectors has a plurality of electrical contacts, and electrical functions of two of the electrical contacts are exchangeable.

6. The keyboard of claim 1, wherein each of the plurality of connectors has an electrical contact, and the plurality of electrical contacts are electrically connected to each other with a conducting wire.

7. The keyboard of claim 1, wherein the controller receives a start signal and an end signal, which respectively represent a start and an end of a process of setting a hot key; during the process of setting the hot key, the first feedbacked pressed response code is set as the hot key at first, and other following feedbacked pressed response codes are set as a content of the hot key after receiving the end signal.

8. The keyboard of claim 7, further comprises an indicating light which indicates the process of setting the hot key, wherein the controller controls the indicating light to emit light in a first state before receiving the first feedbacked pressed response code; the controller controls the indicating light to emit light in a second state after receiving the first feedbacked pressed response code and before receiving the end signal; the controller controls the indicating light to emit light in a third state after setting the content of the hot key; the first state, the second state, and the third state are different from each other.

9. The keyboard of claim 1, further comprising an expanded base which has a plurality of connecting portions other than the connecting portions of the base.

10. A method of controlling a keyboard, comprising the steps of:
providing a keyboard which comprises a base, a plurality of keys, and a controller, wherein the base has a plurality of connecting portions which are connected in parallel, and each of the plurality of keys comprises a key cap, a connector connected to the key cap, and a key chip correspondingly and electrically disposed on the key cap; the connector of each of the keys is detachably and electrically connected to one of the connecting portions; the key chip is electrically connected to the corresponding connector to be electrically connected in parallel; each of the plurality of key chips has a corresponding key code; and the controller is disposed on the base and is electrically connected to the plurality of connecting portions;
communicating with all of the plurality of key chips through the controller by a protocol via the connecting portions connected in parallel;
outputting an inquiring code through the controller to all of the plurality of key chips at the same time, wherein the inquiring code corresponds to key code of one of the key chips;
receiving the inquiring code through the plurality of key chips;
determining whether the key code of each of the key chips corresponds to the inquiring code; and
feed backing the controller with a press state of the corresponding key disposed with the key chip having the corresponding key code, wherein the press state is either a pressed response code or an un-pressed response code; the key chips not having the corresponded key codes make no response to the controller; the key chip which has the corresponded key code to the inquiring code determines whether the corresponding key is pressed; when the corresponding key is pressed, the key chip sends the pressed response code to the controller; when the corresponding key is not pressed, the key chip sends the un-pressed response code to the controller.

11. The method of claim 10, further comprising the step of:
outputting a control code through the controller to each of the plurality of key chips before outputting the inquiring code; the control code requests each of the key chips to determine whether the key code thereof corresponds to the upcoming inquiring code, and to feedback the press state of the key disposed with the key chip having the corresponded key code.

12. The method of claim 10, wherein the connector has three electrical contacts, which are a signal terminal, a ground terminal, and a power supply terminal.

13. The method of claim 10, wherein the connector has an electrical contact, which is not only a power supply terminal but also a signal terminal.

14. The method of claim 10, wherein the connector has a plurality of electrical contacts, and electrical functions of two of the electrical contacts are exchangeable.

15. The method of claim 10, wherein the connector has an electrical contact, and the plurality of electrical contacts are electrically connected to each other with a conducting wire.

16. The method of claim 10, further comprising the steps of:
receiving a start signal which represents a start of a process of setting a hot key; during the process of setting the hot key, the first feedbacked pressed response code is set as the hot key at first;
receiving other following feedbacked pressed response codes; and receiving an end signal which represents an end of a process of setting a hot key, and then setting the other following feed backed pressed response codes as a content of the hot key.

17. The method of claim 16, wherein the keyboard further comprises an indicating light which indicates the process of setting the hot key, wherein the controller controls the indicating light to emit light in a first state before receiving the first feedbacked pressed response code; the controller controls the indicating light to emit light in a second state after receiving the first feedbacked pressed response code and before receiving the end signal; the controller controls the indicating light to emit light in a third state after setting the content of the hot key; the first state, the second state, and the third state are different from each other.

* * * * *